US008925171B2

(12) United States Patent
Eriksson et al.

(10) Patent No.: US 8,925,171 B2
(45) Date of Patent: Jan. 6, 2015

(54) SET OF JAW CRUSHER SHIMS

(75) Inventors: Bengt-Arne Eriksson, Svedala (SE); Roger Sjobeck, Malmo (SE); Karin Ljunggren, Limhamn (SE)

(73) Assignee: Sandvik Intellectual Property AB, Sandviken (SE)

(*) Notice: Subject to any disclaimer, the term of this patent is extended or adjusted under 35 U.S.C. 154(b) by 0 days.

(21) Appl. No.: 14/342,562

(22) PCT Filed: Aug. 22, 2012

(86) PCT No.: PCT/EP2012/066344

§ 371 (c)(1), (2), (4) Date: Mar. 17, 2014

(87) PCT Pub. No.: WO2013/034440

PCT Pub. Date: Mar. 14, 2013

(65) Prior Publication Data

US 2014/0208564 A1 Jul. 31, 2014

(30) Foreign Application Priority Data

Sep. 5, 2011 (EP) .................................... 11179976

(51) Int. Cl.

| | |
|---|---|
| ***B23P 19/00*** | (2006.01) |
| ***B25B 27/14*** | (2006.01) |
| ***F16C 33/00*** | (2006.01) |
| ***B02C 1/02*** | (2006.01) |

(52) U.S. Cl.
CPC ................ *B02C 1/025* (2013.01); *B25B 27/14* (2013.01)
USPC ............................ 29/426.5; 29/278; 384/626

(58) Field of Classification Search
USPC ........ 29/426.5, 426.1, 278; 241/264, 37, 268, 241/32, 219, 286, 267, 298; 384/626
See application file for complete search history.

(56) References Cited

U.S. PATENT DOCUMENTS

| | | | | |
|---|---|---|---|---|
| 1,579,992 A | | 4/1923 | Altman | |
| 3,473,744 A | | 10/1969 | Dediemar | |
| 4,165,044 A | * | 8/1979 | Batch | 241/264 |
| 4,783,013 A | | 11/1988 | Polzin | |
| 4,783,103 A | * | 11/1988 | Schlegel | 292/216 |
| 6,375,105 B1 | | 4/2002 | Haven | |

FOREIGN PATENT DOCUMENTS

FR 1077414 A 11/1954

* cited by examiner

*Primary Examiner* — John C Hong

(74) *Attorney, Agent, or Firm* — Corinne R. Gorski

(57) ABSTRACT

A set of jaw crusher shims for positioning a movable jaw of a jaw crusher, the shims having at least a first and a second shim. Each of the first and second shims including projecting portions arranged to aid with loosening of the shims from each other. The first shim includes a first projecting portion and the second shim includes a second projecting portion. The first and second projecting portions are located at different locations along respective front edges of the first and second shims.

14 Claims, 4 Drawing Sheets

SET OF JAW CRUSHER SHIMS

RELATED APPLICATION DATA

This application is a §371 National Stage Application of PCT International Application No. PCT/EP2012/066344 filed Aug. 22, 2012, claiming priority of EP Application No. 11179976.3, filed May 9, 2011.

TECHNICAL FIELD OF THE INVENTION

The present invention relates to a set of jaw crusher shims for positioning a movable jaw of a jaw crusher, which set of shims comprises at least a first and a second shim.

The present invention also relates to a method of separating a first jaw crusher shim from a second jaw crusher shim arranged for positioning a movable jaw of a jaw crusher.

BACKGROUND ART

Jaw crushers are utilized in many applications for crushing hard material, such as pieces of rock, ore, etc. A jaw crusher has a movable jaw that cooperates with a stationary jaw. Between the jaws a crushing gap is formed. The size of the crushing gap may be adjusted by means of a hydraulic ram which is connected to the movable jaw via a toggle plate and a toggle beam. In order to set a desired closed side setting of such a jaw crusher shims of various widths may be used. Such shims are known from U.S. Pat. No. 4,783,013 and enables an operator to select a suitable combination of shims for a particular position of the toggle beam, and thereby the movable jaw, relative the stationary jaw.

In a crusher operation shims are exposed to high forces which may cause them to stick to each other making it difficult to separate them from each other. Furthermore, removing a shim from a jaw crusher may involve a risk of injuries to an operator.

SUMMARY OF THE INVENTION

It is an object of the present invention to solve, or at least mitigate, parts or all of the above mentioned problems.

This object is achieved by means of a set of jaw crusher shims for positioning a movable jaw of a jaw crusher, which set of shims comprises at least a first and a second shim, wherein each of the first and second shims comprises loosening means adapted to aid loosening of the shims from each other, the first shim comprising a first loosening means and the second shim comprising a second loosening means, the first and second loosening means being located at different locations along respective front edges of the first and second shims.

This set of shims has the advantage that an implement can be engaged with the first and second loosening means to pry the first and second shims apart from each other. The first and second shims can thus be loosened from each other using a simple lever, e.g. in the form of an iron rod. Shims that are stuck to each other can thus be loosened from each other in a simple manner.

The thickness of the first shim is preferably different from the thickness of the second shim. By having a set of shims with various widths an operator can choose a suitable combination of shims for a desired position of the movable jaw.

Preferably, at least the first shim comprises a loosening means in the form of a projecting portion projecting from the front edge of the first shim. The projecting portion may have the form of a projecting tongue or tab.

The projecting portion is preferably formed as an integral part of the first shim. This has the advantage that the shim can be manufactured in a simple manner. Hence, a cost-efficient shim is achieved.

Preferably, each of the first and second shims comprises a loosening means in the form of a respective projecting portion projecting from the respective front edge. This has the advantage that a simple lever, e.g. in the form of an iron rod, may be used to pry the first and second shims apart from each other.

In one embodiment at least one of the first and second shims comprises a loosening means in the form of a recess configured to receive a tool for removing the shim, the recess being arranged in the front edge of shim.

Preferably, at least one of the first and second shims comprises a first shoulder portion projecting from the bottom edge of the shim, the shoulder portion being configured for abutment against a part of a crusher.

Preferably, the at least one shim further comprises a second shoulder portion projecting from the bottom edge of the shim, the second shoulder portion being configured for abutment against another part of a crusher, a shim sliding surface being arranged between the first and second shoulder portions. Such shoulder portions projecting from the bottom edge of a shim has the advantage that the shim is held in a desired position and that undesired displacement from such desired position is prevented.

Each of the two shims is preferably formed from a non-compressible material. Examples of suitable materials include cast steel, forged steel, hot or cold rolled steel and other non-compressible materials that can withstand high mechanical loads.

Furthermore, a tool for removing a jaw crusher shim arranged for positioning a movable jaw of a jaw crusher from the jaw crusher is considered.

The tool comprises an abutment portion for abutment against at least one of the shim and a part of the jaw crusher, engaging means located at a distance from the abutment portion and engageable with a recess of the shim for pulling the shim out of the jaw crusher, and a hand grip portion being located such that a lever arm is formed between the hand grip portion and the abutment portion.

This tool has the advantage that a jaw crusher shim can be removed from the crusher by an operator in a simple and safe manner without the risk for injuries, for example to the hands and fingers of the operator, caused by unsuitable contact with the shims.

Preferably, the engaging means comprises a projecting pin projecting in a direction parallel to a turning axis of the lever arm of the tool in order to further aid removing of the shim.

Preferably, the abutment portion comprises a projecting abutment pin projecting in a direction parallel to a turning axis of the lever arm of the tool, the abutment pin being configured to abut the front edge lower end of the shim in order to further aid removing of the shim.

The hand grip portion preferably comprises an elongate hole which is adapted for a human hand, in order to facilitate removing the shim by hand.

Furthermore, a method of separating a first jaw crusher shim from a second jaw crusher shim arranged for positioning a movable jaw of a jaw crusher is considered. The method involves engaging an implement with a first loosening means arranged on a front edge of the first shim and a second loosening means arranged on a front edge of the second shim, the first and second loosening means being located at different locations along respective front edges of the first and second shims, and turning the implement to pry the first and second shims apart from each other.

BRIEF DESCRIPTION OF THE DRAWINGS

The invention will hereafter be described in more detail and with reference to the appended drawings.

DETAILED DESCRIPTION OF PREFERRED EMBODIMENTS OF THE INVENTION

Figure 1:
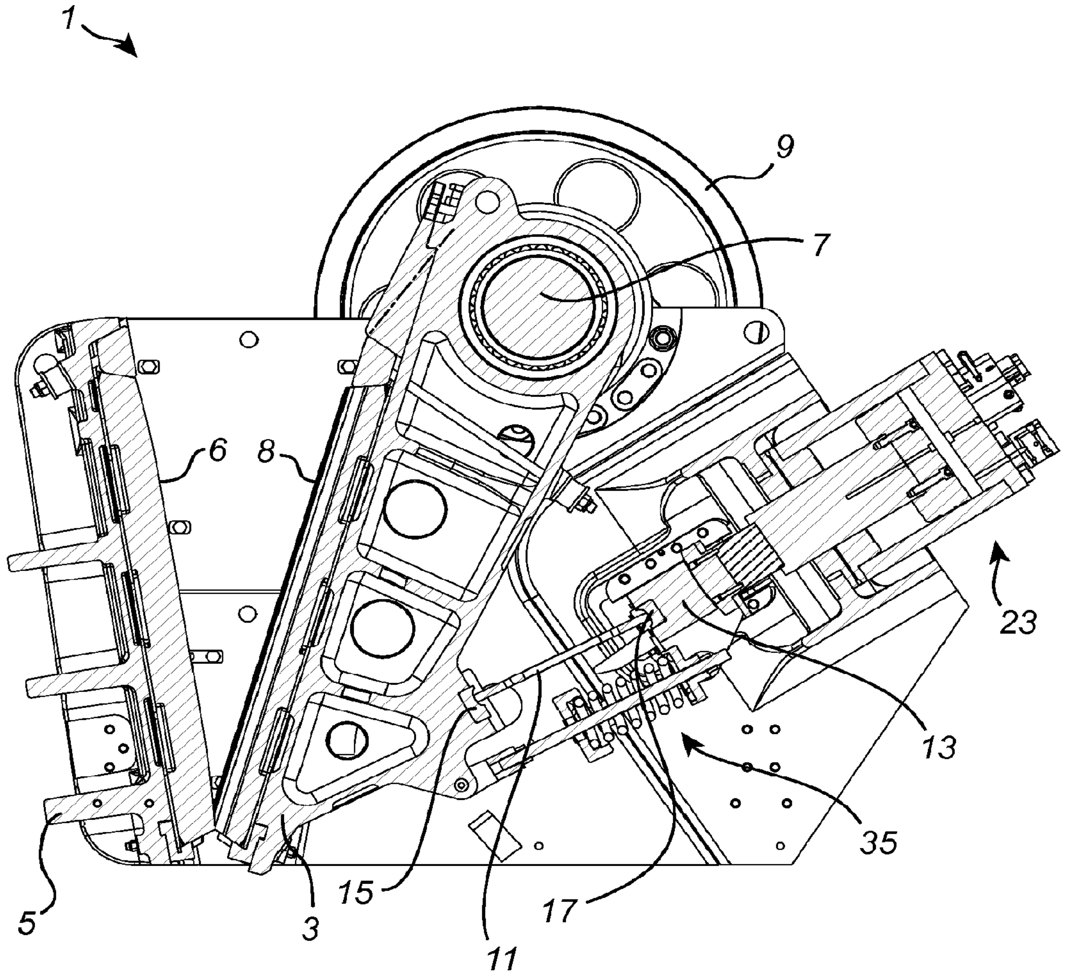
Fig. 1 PRIOR ART
FIG. 1 is a cross-section and illustrates, schematically, a jaw crusher.

FIG. 1 is a cross-section and illustrates, schematically, a jaw crusher 1. The jaw crusher 1 comprises a movable jaw 3 and a stationary jaw 5 forming between them a variable crushing gap. The movable jaw 3 is driven by an eccentric shaft 7 which causes the movable jaw 3 to move back and forth, up and down relative to the stationary jaw 5. The inertia required to crush material fed to the crusher 1 is provided by a weighted flywheel 9 operable to rotate the eccentric shaft 7 on which the movable jaw 3 is mounted. A motor (not shown) is operative for rotating the flywheel 9. The stationary jaw 5 is provided with a wear plate 6, and the movable jaw 3 is provided with a wear plate 8. The movement of the eccentric shaft 7 causes an eccentric motion of the movable jaw 3. The jaws 3, 5 are farther apart at the material inlet than at the material outlet, forming a tapered crushing chamber so that the material is crushed progressively to smaller and smaller sizes between the wear plates 6, 8 as the material travels downward, until the material is small enough to escape from the material outlet at the bottom of the crushing chamber.

The crusher 1 comprises a toggle plate 11, a toggle beam 13, a first toggle plate seat 15 arranged at the lower end of the movable jaw 3 and a second toggle plate seat 17 arranged along a front edge of the toggle beam 13. The toggle plate 11 is seated between the first 15 and second 17 toggle seats.

The crusher 1 comprises a hydraulic positioning device 23, which abuts the toggle beam 13 for positioning the movable jaw 3 to a desired position, i.e. to a desired closed side setting. By "closed side setting" is meant the shortest distance between the wear plate 6 of the stationary jaw 5 and the wear plate 8 of the movable jaw 3. The hydraulic positioning device 23 may, e.g., be used to adjust the position of the movable jaw 3 to compensate for wear of the wear plates 6, 8. Furthermore, the hydraulic positioning device 23 may also be used for adjusting the position of the movable jaw 3 to adapt the crusher 1 for crushing various types of materials, and to obtain various average sizes of the crushed material.

The crusher 1 comprises a toggle squeezing device 35 holding the toggle plate 11 in position. The squeezing device 35 is arranged to apply a squeezing force between the movable jaw 3 and the hydraulic positioning device 23.

Figure 2:
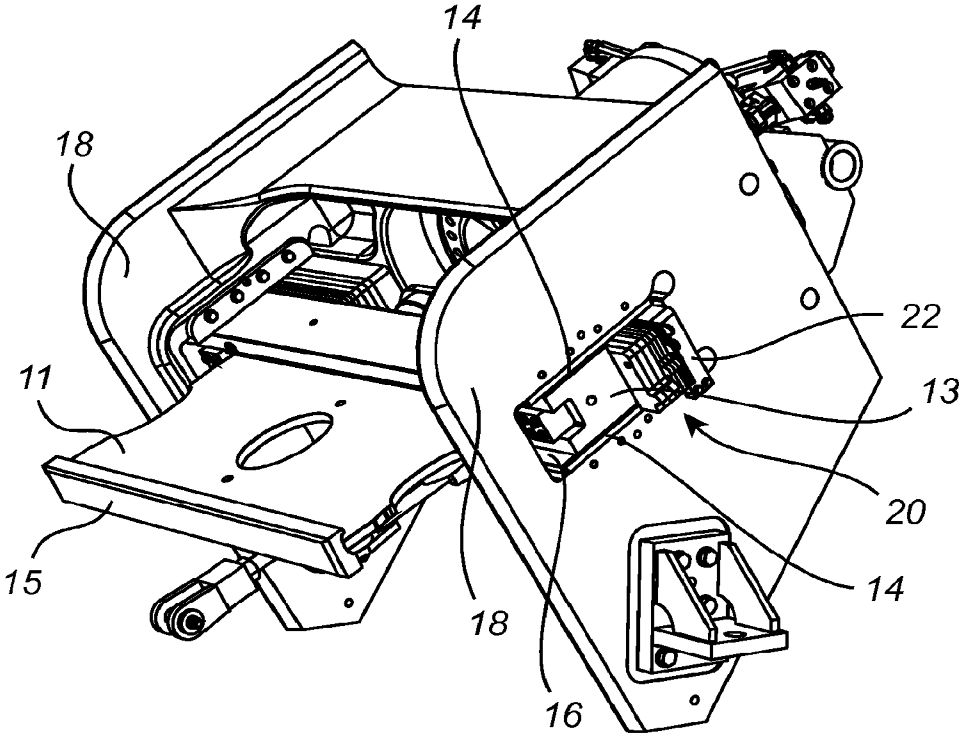
Fig. 2 PRIOR ART
FIG. 2 is a side view and illustrates, schematically, parts of the jaw crusher shown in FIG. 1.

FIG. 2 shows parts of the crusher shown in FIG. 1. The toggle beam 13, which has a generally rectangular cross section, is slidably arranged along guide plates 14 mounted in elongated apertures 16 at respective side walls 18 of the crusher 1. The toggle beam 13 is thus displaceable towards and away from the stationary jaw 5 under the guidance of the guide plates 14. Since the toggle beam 13 is slidable various closed side settings can be set.

Initially, i.e. before running a crusher operation, the toggle beam 13 is normally adjusted using the hydraulic positioning device 23 until a desired closed side setting is reached. The size of the crushing gap may thus be adjusted by means of the hydraulic positioning device 23 which abuts the movable jaw 3 via the toggle plate 11 and the toggle beam 13.

The jaw crusher 1 is provided with a set of jaw crusher shims 20 according to an embodiment of the present invention. The set of shims 20 comprises shims having various widths. The set of shims 20, which is arranged between the toggle beam 13 and a shim supporting element 22, enable the holding of the movable jaw 3 in a desired position and thus provides for easy adjustment of the closed side setting. The set of shims 20 enable an operator to select a suitable combination of shims for a particular position of the toggle beam 13, and thereby the movable jaw 3, relative to the stationary jaw 5.

Figure 3:
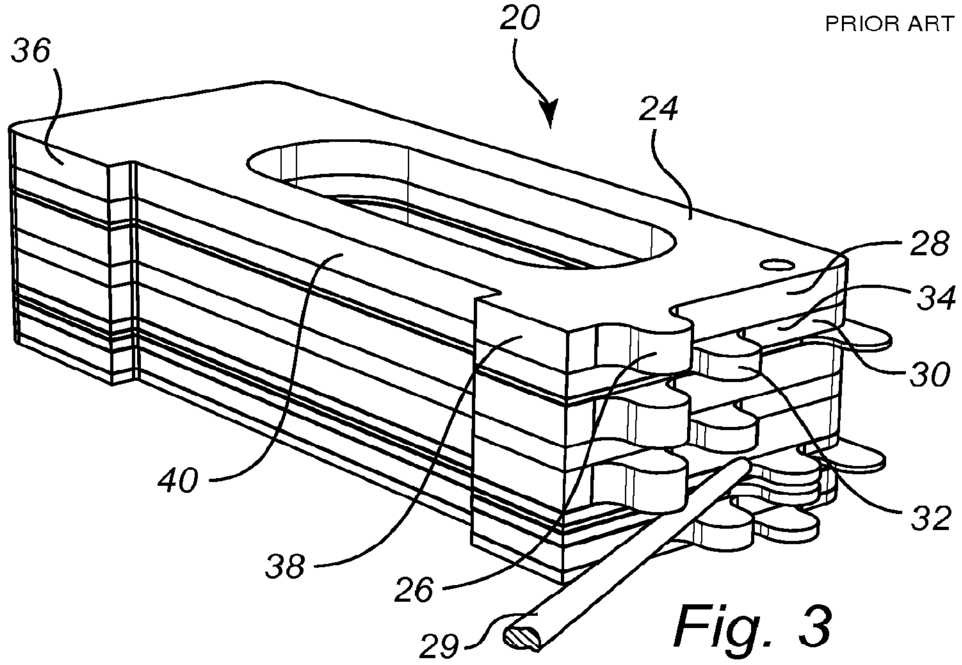
FIG. 3 is a perspective view and illustrates, schematically, a set of jaw crusher shims according to an embodiment of the present invention.

FIG. 3 shows the set of shims 20 shown in FIG. 2. Each of the shims comprises a loosening means, in the form of a projecting portion, at different locations along a respective front edge. Hence, a first shim 24 comprises a first loosening means, in the form of a projecting portion 26 formed as an integral part of the first shim 24, along a front edge 28 of the first shim 24, and a second shim 30 comprises a second loosening means, in the form of a projecting portion 32 formed as an integral part of the second shim 30, along a front edge 34 of the second shim 30. The first 26 and second 32 projecting portions are located at different locations along the respective front edges 28, 34. This location of the shims 24, 30 allows an implement in the form of a loosening tool 29, such as a screw driver or other rod-like tool, to be inserted between the loosening means 26, 32 to pry the first shim 24 from the second shim 30. Hence, a tool 29, such as an iron rod can be used to separate the first 24 and second 30 shims from each other in an easy manner.

The shims, e.g. the first 24 and second 30 shims, of the set of shims 20 are arranged such that adjacent shims have their projecting portions at different locations along respective front edges in order to enable loosening of an individual shim from another. Shims having the same thickness and thus having projecting portions, such as projecting tongues, at the same location along respective front edges are thus not located next to each other. The loosening means enables an operator to pry one of the shims from an adjacent shim. The set of shims thus provides a simple releasing process upon adjustment of the position of the movable jaw 3.

It will be appreciated that the set of shims 20 may comprise several shim sizes, having different thicknesses, each or at least some of those shim sizes having projecting portions located on different locations along their respective front edges, as illustrated in FIG. 3. A set of shims 20 may, for example, comprise shims of thicknesses 20 mm, 10 mm, 5 mm, 3 mm and/or 2 mm. In one embodiment each size of shim 24, 30 has an individual location of the respective projecting portion. Hence, for example, the 20 mm shims could have a location of the projecting portion that would be different from shims of other thicknesses. By combining a suitable number of such various types of shims in a set of shims 20 and arranging such set of shims 20 between the shim supporting element 22 and the toggle beam 13 illustrated in FIG. 2 a desired closed side setting can be set.

Returning to FIG. 3, each shim of the set of shims 20 comprises a first and a second shoulder portion projecting from the front end bottom edge of the shim which abuts against a part of the crusher frame. The first shim 24 thus comprises a first shoulder portion 36 and a second shoulder portion 38. Between the first 36 and second 38 shoulder portions a shim sliding surface 40 is formed. The first 36 and second 38 shoulder portions are formed to hold the shim 24 in position and thus prevent the shim 24 from undesired displacement from this position.

Figure 4A:
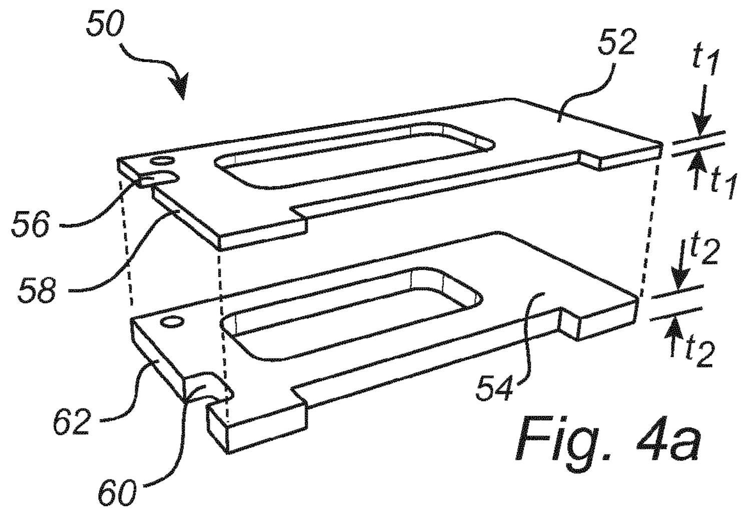
FIG. 4*a* is a perspective view and illustrates, schematically, a set of jaw crusher shims according to a second embodiment of the present invention.
Figure 4B:
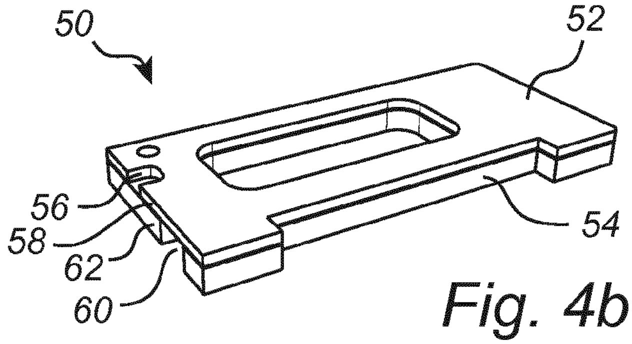
FIG. 4*b* is a perspective view and illustrates, schematically, the set of shims shown in FIG. 4*a*.

FIGS. 4*a*-*b* show a set of shims 50 according to a second embodiment of the present invention. The set of shims 50 comprises a first shim 52 having thickness $t_1$ and a second shim 54 having thickness $t_2$, wherein $t_1 < t_2$. The first shim 52 comprises a first loosening means, in the form of a recess 56, located along a front edge 58 of the first shim 52, and the second shim 54 comprises a second loosening means, in the form of a recess 60, located along a front edge 62 of the second shim 54. The first and second loosening means 56, 60 are located at different locations along the respective front edges 58, 62. Since the first and second loosening means 56, 60 are located at different locations along respective front edges 58, 62 of the first 52 and second 54 shims an implement can be inserted in the respective recesses to pry the first 52 shim apart from the second 54 shim.

Figure 5:
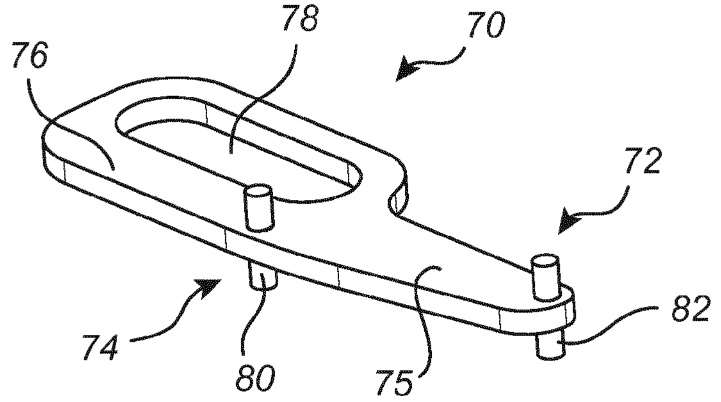
FIG. 5 is a perspective view and illustrates, schematically, a tool for removing a jaw crusher shim.

FIG. 5 shows a shim removing tool 70 adapted for removing a jaw crusher shim arranged for positioning a movable jaw of a jaw crusher from a jaw crusher. The tool 70 comprises an abutment portion 72 for abutment against another shim or against a part of the jaw crusher, engaging means 74 located at a distance from the abutment portion 72 and engageable with a recess of a shim for pulling the shim out of a jaw crusher, and a hand grip portion 76 which is located such that a lever arm 75 is formed between the hand grip portion 76 and the abutment portion 72. The hand grip portion 76 comprises an elongate hole 78.

The engaging means 74 comprises a projecting pin 80, in the form of a cylinder, projecting in a direction parallel to a turning axis of the lever arm 75 of the tool 70. The projecting pin 80 is adapted for engagement with a recess 84 of a shim 24, as illustrated in FIG. 6*a*.

The abutment portion 72 comprises a projecting abutment pin 82, in the form of a cylinder, projecting in a direction parallel to a turning axis of the lever arm 75 of the tool 70. The abutment pin 82 is configured to abut the front edge lower end of a shim.

Figure 6A:
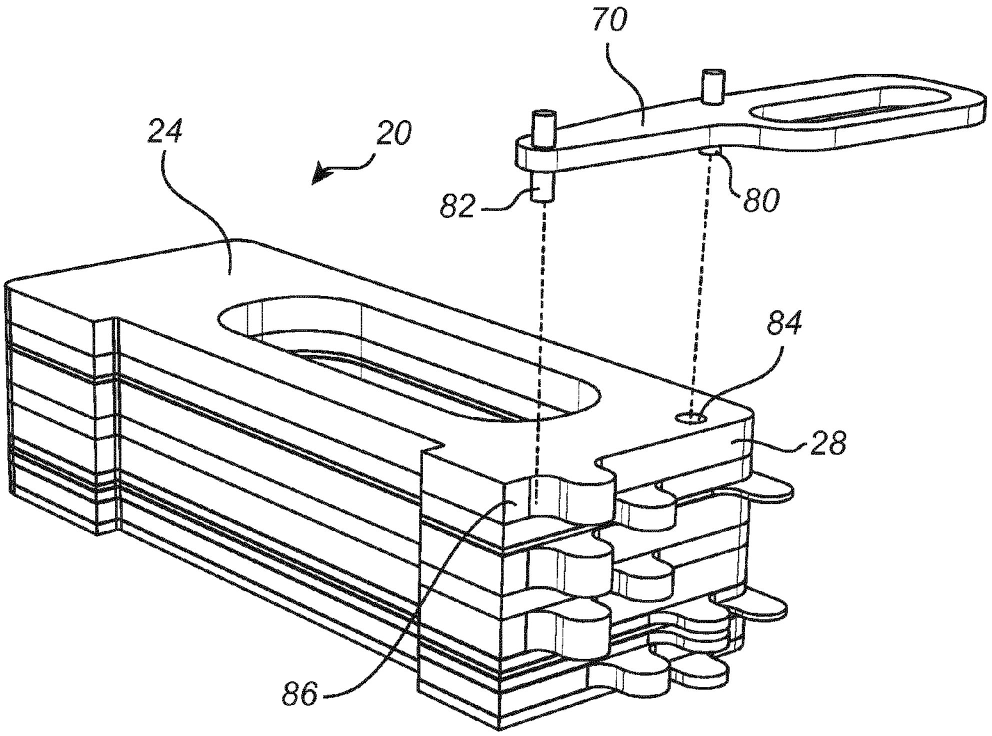
FIG. 6*a* is a perspective view and illustrates, schematically, a tool for removing a jaw crusher shim and a set of jaw crusher shims.

FIG. 6*a* illustrates that the tool 70 is engageable with a recess 84 of a shim 24 of a set of shims 20. In the situation illustrated in FIG. 6*a*, the projecting pin 80 is about to be inserted into the recess 84 of the shim 24, and the abutment pin 82 is about to abut a lower end 86 of a front edge 28 of the shim 24.

Figure 6B:
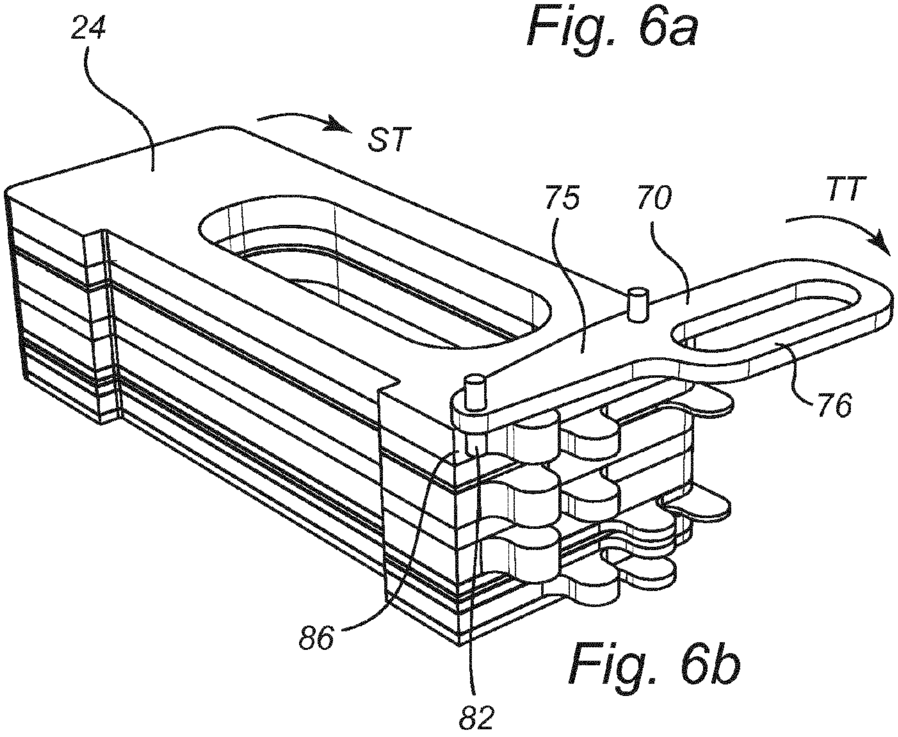
FIG. 6*b* is a perspective view and illustrates, schematically, a tool for removing a jaw crusher engaged with a jaw crusher shim.

FIG. 6*b* shows the tool 70 when engaged with the shim 24. The abutment portion pin 82 abuts the front edge 28 lower end 86 of the shim 24, and the projecting pin 80 is inserted in the recess 84 (hidden in FIG. 6*b*). By gripping the hand grip portion 76 and turning the tool 70 in the direction of the arrow TT, a turning momentum will be exerted on the shim 24, by means of the tool 70 lever arm 75 effecting a turning momentum between the abutment portion pin 82 and the projecting pin 80, and the shim 24 will be swung up from its position, as indicated by arrow ST, making it easy to remove the shim 24 from its position in the jaw crusher.

It will be appreciated that numerous modifications of the embodiments described above are possible within the scope of the appended claims.

The invention claimed is:

1. A set of jaw crusher shims for positioning a movable jaw of a jaw crusher comprising at least a first and a second shim, each of the first and second shims including loosening means arranged to aid loosening of the shims from each other, the first shim having a first loosening means and the second shim having a second loosening means, the first and second loosening means being located at different locations along respective front edges of the first and second shims.

2. The set of shims according to claim 1, wherein a thickness of the first shim is different from a thickness of the second shim.

3. The set of shims according to claim 1, wherein at least the first loosening means is a projecting portion projecting from the front edge of the first shim.

4. The set of shims according to claim 3, wherein the projecting portion is formed as an integral part of the first shim.

5. The set of shims according to claim 1, wherein the loosening means of each of the first and second shims is a respective projecting portion projecting from the respective front edge.

6. The set of shims according to claim 1, wherein at least the first loosening means is a recess configured to receive an implement for separating the first shim from the second shim, the recess being arranged in the front edge of the first shim.

7. The set of shims according to claim 1, wherein at least one of the first and second shims includes a first shoulder portion projecting from a bottom edge of the shim, the shoulder portion being configured for abutment against a part of a crusher.

8. The set of shims according to claim 7, wherein the at least one shim includes a second shoulder portion projecting from the bottom edge, the second shoulder portion being configured for abutment against another part of a crusher, a shim sliding surface being arranged between the first and second shoulder portions.

9. The set of shims according to claim 1, wherein each of the first and second shims is formed from a non-compressible material.

10. A tool for removing a jaw crusher shim arranged for positioning a movable jaw of a jaw crusher from the jaw crusher, the tool comprising:

an abutment portion for abutment against at least one shim and a part of the jaw crusher;

engaging means located at a distance from the abutment portion and engageable with a recess of the shim for pulling the shim out of the jaw crusher; and a hand grip portion being located such that a lever arm is formed between the hand grip portion and the abutment portion.

11. The tool according to claim 10, wherein the engaging means projecting in a direction parallel to a turning axis of the lever arm of the tool.

12. The tool according to claim 10, wherein the abutment portion includes a projecting abutment pin projecting in a direction parallel to a turning axis of the lever arm of the tool, the abutment pin being configured to abut a front edge lower end of the shim.

13. The tool according to claim 10, wherein the hand grip portion includes an elongate hole.

14. A method of separating a first jaw crusher shim from a second jaw crusher shim arranged for positioning a movable jaw of a jaw crusher, the method comprising the steps of:

engaging an implement with a first loosening means arranged on a front edge of the first shim and a second loosening means arranged on a front edge of the second shim, the first and second loosening means being located at different locations along respective front edges of the first and second shims; and turning the implement.

* * * * *